(12) United States Patent
Ishii

(10) Patent No.: US 6,385,635 B1
(45) Date of Patent: May 7, 2002

(54) PRODUCT SUM OPERATION DEVICE CAPABLE OF CARRYING OUT FAST OPERATION

(75) Inventor: Daiji Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/296,653

(22) Filed: Apr. 23, 1999

(30) Foreign Application Priority Data

Apr. 23, 1998 (JP) .......................................... 10-129486

(51) Int. Cl.⁷ ................................................ G06F 7/38
(52) U.S. Cl. ...................................... 708/603; 708/319
(58) Field of Search ................................. 708/603, 319, 708/523, 501

(56) References Cited

U.S. PATENT DOCUMENTS

| 5,513,223 | A | | 4/1996 | Shoji | |
|---|---|---|---|---|---|
| 5,941,940 | A | * | 8/1999 | Prasad et al. | 708/523 |
| 6,035,316 | A | * | 3/2000 | Peleg et al. | 708/603 |
| 6,078,939 | A | * | 6/2000 | Story et al. | 708/603 |

FOREIGN PATENT DOCUMENTS

| DE | 3637828 A1 | 9/1987 |
|---|---|---|
| DE | 36 37 828 | 9/1987 |
| JP | 58-207177 | 12/1985 |
| JP | 62-25376 | 2/1987 |
| JP | 7-142960 | 6/1995 |
| JP | 9-269939 | 10/1997 |

OTHER PUBLICATIONS

Harris Semiconductor: "Complex Filtering with the HSP43168 Dual FIR Filter", Application Note AN9418.1, (1998), pp. 3–302–3–306, XP002160279.

* cited by examiner

Primary Examiner—David H. Malzahn
(74) Attorney, Agent, or Firm—Foley & Lardner

(57) ABSTRACT

Multipliers 107 through 110 carry out an multiplication operation with two data out of the four data transferred from a memory over buses 101 through 104. The multiplication results are subjected to an addition or subtraction operation with each other in adder-subtracters 111 and 112. The operation results obtained by the adder-subtracters 111 and 112 are supplied to adders 113 and 114 where they are added to values held by accumulators 115 and 116. A latch circuit 105 supplies the data transferred through the bus 102 to the multiplier 109 when a control signal 106 indicates "ON". The latch circuit 105 temporarily holds the data transferred through the bus 102 and supplies the data held therein to the multiplier 109 when a control signal 106 indicates "OFF".

7 Claims, 4 Drawing Sheets

PRODUCT SUM OPERATION DEVICE CAPABLE OF CARRYING OUT FAST OPERATION

CROSS-REFERENCE TO RELATED PATENT APPLICATIONS

Japan Priority Application 10-129486, filed Apr. 23, 1998 including the specification, drawings, claims and abstract, is incorporated herein by reference in its entirety.

BACKGROUND OF THE INVENTION

The present invention relates to a product sum operation device and, more particularly, to a product sum operation device that is capable of carrying out a fast product sum operation with real and complex numbers.

With recent increase in capacity and function in the communication industry, faster processing becomes more and more important for modulation/demodulation, Fourier transform, and base band transmission. These types of processing uses a product sum operation with the real and complex numbers. For the product sum operation with complex numbers, a single operation involves in four-time multiplication, three-time addition, and one-time subtraction of real numbers. A larger sampling frequency results in a shorter processing time available for a single product sum operation with the real numbers. Thus such a product sum operation device is essential that is capable of carrying out an operation with real and complex numbers at a higher speed.

The product sum operation device for a faster product sum operation is disclosed in, for example, Japanese Patent Laid-open No. 9-269939. As will be described more in detail below, the product sum operation device disclosed expedites the product sum operation with the real and complex numbers by means of two parallel processing of multiplication and addition. However, the increase in speed to this extent may not be sufficient to provide a satisfactory performance with a possible larger capacity required for communications in the future. Furthermore, the product sum operation device disclosed has a rather complex configuration of an input section including two delay elements and two multiplexers.

SUMMARY OF THE INVENTION

Therefore, an object of the present invention is to provide a product sum operation device that is capable of carrying out a fast product sum operation with real and complex numbers.

Another object of the present invention is to provide a product sum operation device having a relatively simple configuration.

A product sum operation device according to the present invention achieves a fast product sum operation with real and complex numbers by means of increasing the number of arithmetic operation units and data transfer units to thereby increase the level of parallelism.

The product sum operation device according to a first aspect of the present invention comprises a data transfer section for transferring four data simultaneously; and first through fourth multipliers adapted to receive two data that are assigned in advance out of the four data transferred from the data transfer section to carry out a multiplication operation with the two data received. The product sum operation device further comprises a first adder-subtracter for carrying out adding and subtracting operations with the multiplication results obtained by the first and second multipliers; a second adder-subtracter for carrying out adding and subtracting operations with the multiplication results obtained by the third and the fourth multipliers; and first and second accumulators. The product sum operation device further comprises a first adder for adding the addition result obtained by the first adder-subtracter to a value previously stored in the first accumulator to give the addition result to the first accumulator as a new value; and a second adder for adding the addition result obtained by the second adder-subtracter to a value previously stored in the second accumulator to give the addition result to the second accumulator as a new value.

A product sum operation device according to a second aspect of the present invention comprises a data transfer section for transferring four data simultaneously; and first through fourth multipliers provided correspondingly to one of the four data transferred from the data transfer section to calculate square of the data transferred. The product sum operation device further comprises a first adder-subtracter for carrying out adding and subtracting operations with the multiplication results obtained by the first and second multipliers; a second adder-subtracter for carrying out adding and subtracting operations with the multiplication results obtained by the third and the fourth multipliers; and first and second accumulators. The product sum operation device further comprises a first adder for adding the addition result obtained by the first adder-subtracter to a value previously stored in the first accumulator to give the addition result to the first accumulator as a new value; and a second adder for adding the addition result obtained by the second adder-subtracter to a value previously stored in the second accumulator to give the addition result to the second accumulator as a new value.

A product sum operation device according to a third aspect of the present invention comprises first through fourth buses for transferring first through fourth data; and first through fourth multiplexers connected to two buses out of the first through the fourth buses that are assigned in advance. The first through the fourth multiplexers are for selecting, in response to a selection signal, one of the data transferred over the two buses in accordance with the selection signal to produce selected data. The product sum operation device further comprises a first multiplier for multiplying the data transferred over the first bus with the data supplied from the first multiplexer; a second multiplier for multiplying the data transferred over a second bus with the data supplied from a second multiplexer; a third multiplier for multiplying the data transferred over a third bus with the data supplied from a third multiplexer; and a fourth multiplier for multiplying the data transferred over the fourth bus with the data supplied from the fourth multiplexer. The product sum operation device further comprises a first adder-subtracter for carrying out adding and subtracting operations with the multiplication results obtained by the first and the second multipliers; a second adder-subtracter for carrying out adding and subtracting operations with the multiplication results obtained by the third and the fourth multipliers; and first and second accumulators. The product sum operation device further comprises a first adder for adding the addition result obtained by the first adder-subtracter to a value previously stored in the first accumulator to give the addition result to the first accumulator as a new value; and a second adder for adding the addition result obtained by the second adder-subtracter to a value previously stored in the second accumulator to give the addition result to the second accumulator as a new value.

DESCRIPTION OF THE PREFERRED EMBODIMENTS

Figure 1:
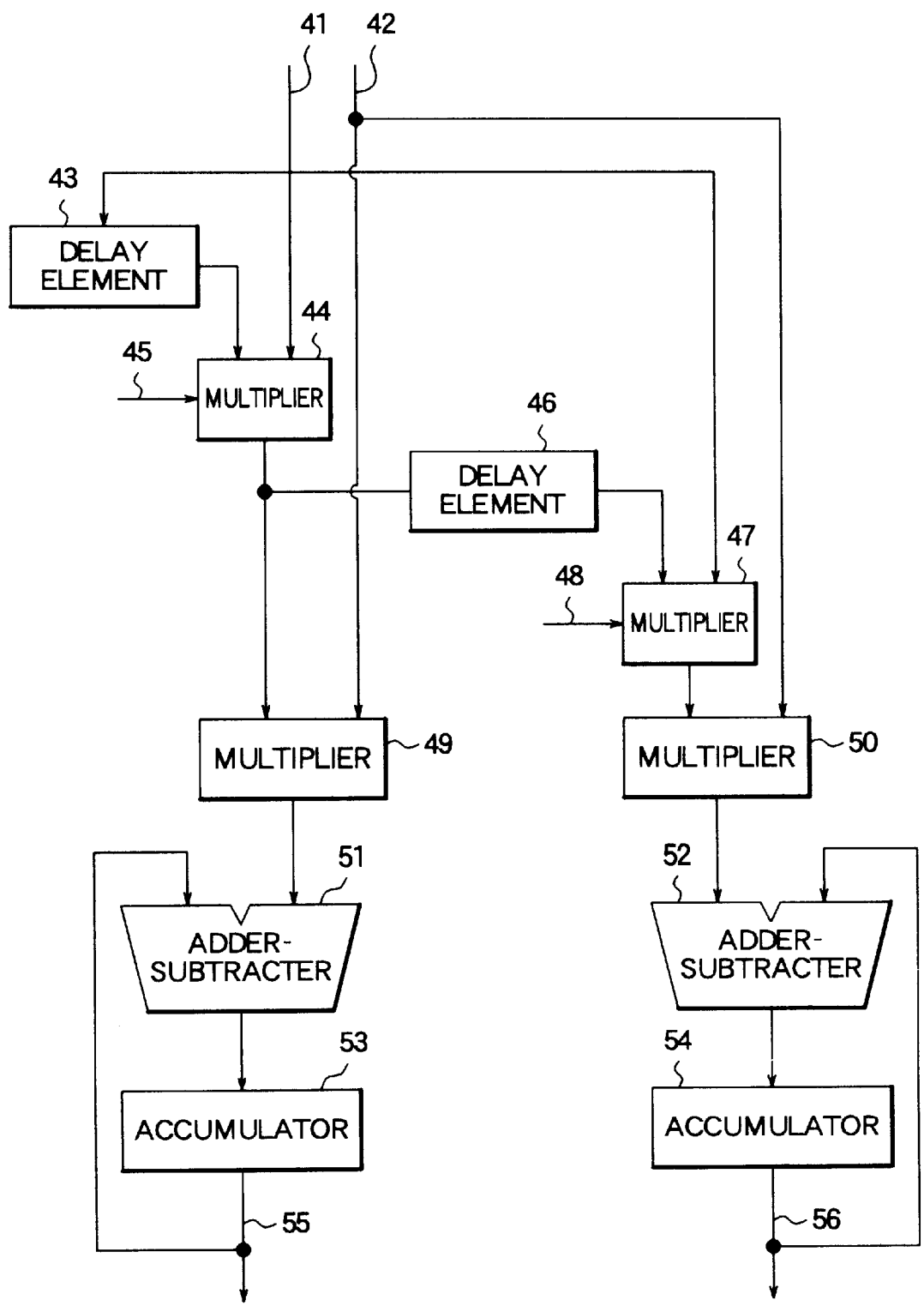
FIG. 1 is a block diagram showing a configuration of a conventional product sum operation device.

Referring to FIG. 1, a conventional product sum operation device is described for the purpose of facilitating the understanding of the present invention. In FIG. 1, the product sum operation device comprises buses 41 and 42 for receiving data, delay elements 43 and 46, and multipliers 49 and 50. The delay elements 43 and 46 are for holding data received in the latest step. The multipliers 49 and 50 carry out a multiplication operation with the received data. Multiplexers 44 and 47 are for selecting inputs to the multipliers 49 and 50 in accordance with control signals 45 and 48. The product sum operation device further comprises adder-subtracters 51 and 52, accumulators 53 and 54, and buses 55 and 56 for producing data. The adder-subtracters 51 and 52 are for adding or subtracting cumulatively the multiplication results obtained by the multipliers 49 and 50 to or from the values held by the accumulators 53 and 54.

This product sum operation device may be used for the implementation of an FIR filter and for the product sum operation with complex numbers. These applications are now described. First, implementation of the FIR filter is described for the case of a fourth order filter.

A filter output y(n) at a time instant n can be given by the equation (1), y(n) equals the product of a0 and x(n) plus the product of a1 and x(n−1) plus the product of a2 and x(n−2) plus the product of a3 and x(n−3), that is:

$$y(n)=a0 \cdot x(n)+a1 \cdot x(n-1)+a2 \cdot x(n-2)+a3 \cdot x(n-3) \quad (1)$$

The operation device carries out calculation operations in parallel for the filter output y(n) at the time instant n that is given by the equation (1) and for a filter output y(n+1) at a time instant (n+1) given by the equation (2), y(n+1) equals the product of a0 and x(n+1) plus the product of a1 and x(n) plus the product of a2 and x(n−1) plus the product of a3 and x(n−2), that is:

$$y(n+1)=a0 \cdot x(n+1)+a1 \cdot x(n)+a2 \cdot x(n-1)+a3 \cdot x(n-2) \quad (2)$$

In the above equations (1) and (2), x(n+1), x(n), x(n−1), x(n−2), and x(n−3) are filter inputs received by the filter at time instants (n+1), n, (n−1), (n−2), and (n−3), respectively. In addition, a0, a1, a2, and a3 are filter coefficients.

The operation device requires five steps for the calculation with the equations (1) and (2). It is noted that only a last fifth step is described here but first through fourth steps are similar in operation to the fifth step except for the data subjected to the calculation.

Before initiation of the fifth step, the accumulator 53 holds the calculation result of a1·x(n)+a2·x(n−1)+a3·x(n−2) in the operation of the fourth step. On the other hand, the accumulator 54 holds the calculation result of a1·x(n−1)+a2·x(n−2)+a3·x(n−3). The delay element 46 is supplied with the filter input x(n).

The fifth step is then initiated. First, the filter input x(n+1) and the filter coefficient a0 are transferred from a memory (not shown) over the buses 41 and 42. The delay element 46 produces the data x(n) held therein and then holds the data x(n+1) supplied over the bus 41.

The multiplier 49 multiplies the data x(n+1) supplied over the bus 41 and the data a0 supplied over the bus 42 to produce the product of a0 and x(n+1) as a multiplication result. The multiplier 50 multiplies the output x(n) of the delay element 46 and the data a0 supplied over the bus 42 to produce the product of a0 and x(n) as a multiplication result.

These multiplication results are added to the values held by the accumulators 53 and 54. More specifically, the adder-subtracters 51 and 52 add the multiplication results to the values held by the accumulators 53 and 54, respectively. Thus the accumulators 53 and 54 hold y(n+1) and y(n), respectively. This completes the operation to implement the FIR filter.

Next, a product sum operation with complex numbers is described. The product sum operation with the complex numbers can be given by the following equation (3):

$$(A+jB) \cdot (C+jD)+(E+jF)=(A \cdot C-B \cdot D+E)+j(A \cdot D+B \cdot C+F) \quad (3)$$

In the equation (3), the symbols A through F represent data.

It is assumed that data E of the complex numbers (E+jF) are stored in the accumulator 53 while the data F are stored in the accumulator 54. Under this circumstances, the equation (3) is calculated through the following three steps.

The first step involves in the following processing as a preparation for the actual calculation. The data A and the value 0 are transferred from the memory through the buses 41 and 42. Both the delay elements 43 and 46 hold the data A. Both the multipliers 49 and 50 multiply the data A supplied over the bus 41 with the value 0 supplied over the bus 42 to produce the product of A and 0, which is equal to zero, as a multiplication result. The multiplication result of zero is supplied to the adder-subtracters 51 and 52 where it is added to the value held by the accumulators 53 and 54.

In the second step, data B and data C are transferred from the memory through the buses 41 and 42, respectively. As a result, the delay element 43 holds the data B and the delay element 46 holds the output data A from the delay element 43. The multiplier 49 multiplies the output data A from the delay element 43 with the data C supplied over the bus 42 to produce the product of A and C as a multiplication result. The multiplier 50 multiplies the data B supplied over the bus 41 with the data C supplied over the bus 42 to produce the product of B and C as a multiplication result. The adder-subtracters 51 and 52 add these multiplication results to the values held by the accumulators 53 and 54, respectively. Thus, the accumulators 53 and 54 hold (E+A·C) and (F+B·C), respectively.

In the third step, the data D is transferred from the memory through the bus 42. The multiplier 49 multiplies the output data B from the delay element 43 with the data D supplied over the bus 42 to produce the product of B and D as a multiplication result. The multiplier 50 multiplies the output data A supplied from the delay element 46 and the data D supplied over the bus 42 to produce the product of A and D as a multiplication result.

The multiplication result B·D is subtracted in the adder-subtracter 51 from the value held by the accumulator 53. The multiplication result A·D is added in the adder-subtracter 52 to the value held by the accumulator 54. Thus the accumulators 53 and 54 hold real and imaginary parts, respectively, of the result of the product sum operation.

As described above, the conventional product sum operation device expedites the product sum operation with the real and the complex numbers by means of the two parallel processing of multiplication and addition. However, the increase in speed to this extent may not be sufficient to provide a satisfactory performance with a possible larger capacity required for communications in the future. Furthermore, the product sum operation device disclosed has a rather complex configuration of an input section including two delay elements and two multiplexers.

Figure 2:
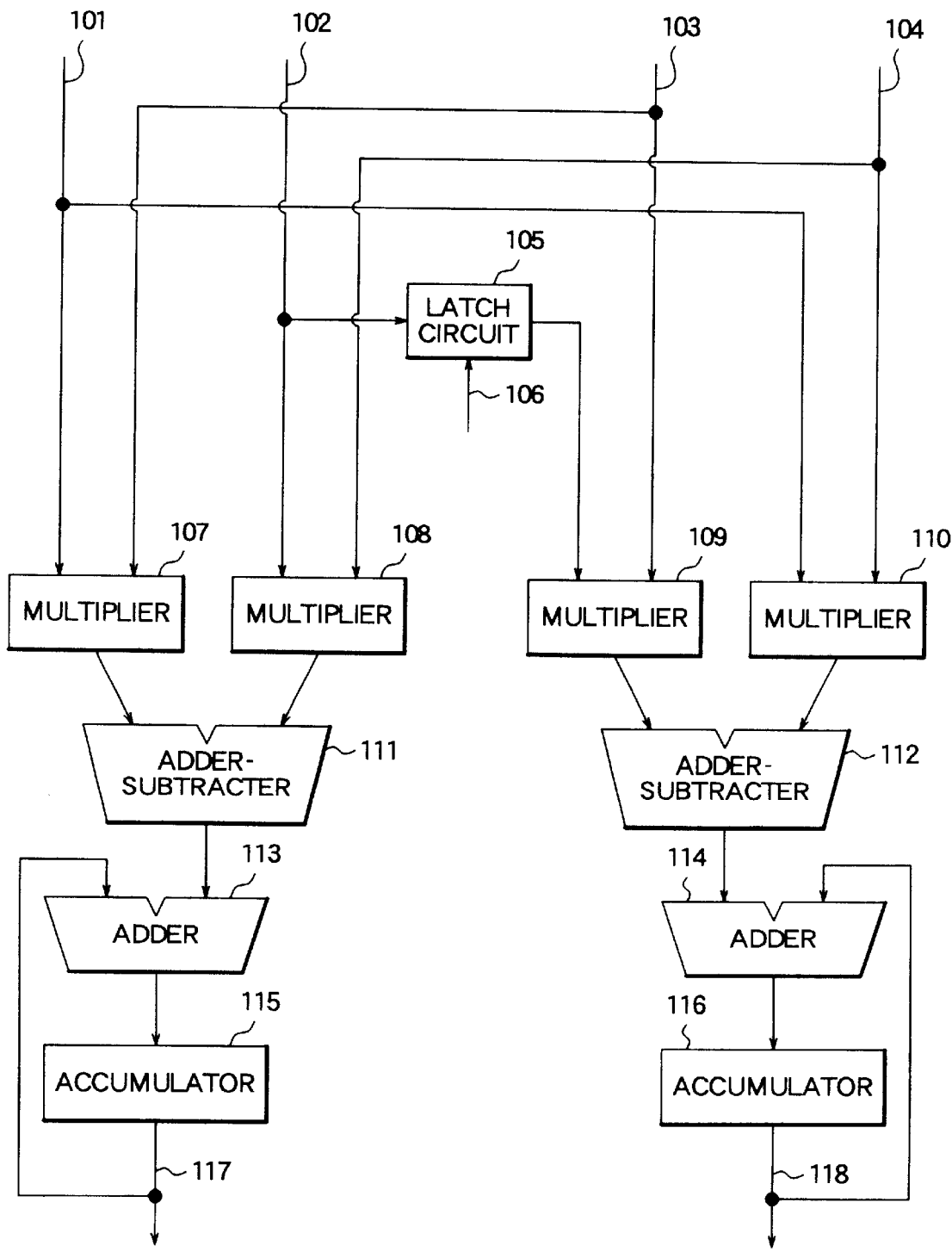
FIG. 2 is a block diagram showing a configuration of a product sum operation device according to a first embodiment of the present invention.

Referring now to FIG. 2, a product sum operation device according to a first embodiment of the present invention is described. In FIG. 2, the product sum operation device according to this embodiment comprises buses 101, 102, 103, and 104 for four words to transfer simultaneously data corresponding to four words from a memory (not shown). The product sum operation device further comprises a latch circuit 105, multipliers 107, 108, 109 and 110, adder-subtracters 111 and 112, adders 113 and 114, accumulators 115 and 115, and buses 117 and 118. The latch circuit 105 is for passing through and holding input data in accordance with a control signal 106. The multipliers 107 through 110 carry out a multiplication operation with the input data to produce a product as a multiplication result. The adder-subtracters 111 and 112 carry out an addition-subtraction operation with the multiplication results obtained by the multipliers 107 through 110. The adders 113 and 114 add the results obtained by the adder-subtracters 111 and 112 to values held by accumulators 115 and 116, respectively.

The latch circuit 105 outputs the data as it is that is transferred over the bus 102 when the control signal 106 indicates "ON", namely, has a high level. The latch circuit 105 temporarily holds the data transferred over the bus 102 when the control signal 106 indicates "OFF", namely, has a low level and outputs it in the subsequent step.

The multiplier 107 carries out a multiplication operation with the data transferred from the memory over the buses 101 and 103. The multiplier 108 carries out a multiplication operation with the data transferred from the memory over the buses 102 and 104. The multiplier 109 carries out a multiplication operation with the data transferred from the memory over the buses 103 and the data supplied from the latch circuit 105. The multiplier 110 carries out a multiplication operation with the data transferred from the memory over the buses 101 and 104.

The adder-subtracter 111 adds the multiplication result obtained by the multiplier 107 to or subtracts it from the multiplication result obtained by the multiplier 108. The adder-subtracter 112 adds the multiplication result obtained by the multiplier 109 to or subtracts it from the multiplication result obtained by the multiplier 110. The adder 113 adds the result obtained by the adder-subtracter 111 to the value held by the accumulator 115 to produce a sum as an addition result. The adder 114 adds the result obtained by the adder-subtracter 112 to the value held by the accumulator 116 to produce a sum as an addition result.

The accumulator 115 holds the addition result obtained by the adder 113 and outputs the held value in the subsequent step. The accumulator 116 holds the addition result obtained by the adder 114 and outputs the held value in the subsequent step.

Next, how the product sum operation device according to the present invention provides its function is described. The data corresponding to four words are transferred from the memory over the buses 101 through 104 to the multipliers 107 through 110 and the latch circuit 105. These data are used for the multiplication operation carried out by the multipliers 107 through 110. More specifically, the multiplier 107 multiplies the data transferred over the bus 101 with the data transferred over the bus 103. The multiplier 108 multiplies the data transferred over the bus 102 with the data transferred over the bus 104. The multiplier 109 multiplies the data transferred over the bus 103 with the data supplied from the latch circuit 105. The multiplier 110 multiplies the data transferred over the bus 101 with the data transferred over the bus 104.

After these multiplication operations, the products obtained by the multipliers 107 through 110 as multiplication results are subjected to an addition or subtraction operation in the adder-subtracters 111 and 112. More specifically, the adder-subtracter 111 adds the multiplication result obtained by the multiplier 107 to or subtract it from the multiplication result obtained by the multiplier 108. The adder-subtracter 112 adds the multiplication result obtained by the multiplier 109 to or subtract it from the multiplication result obtained by the multiplier 110.

The results obtained by the adder-subtracters 111 and 112 are supplied to the adders 113 and 114 where they are added to the values held by the accumulators 115 and 116. More specifically, the adder 113 adds the result obtained by the adder-subtracter 111 to the value held by the accumulator 115. The adder 114 adds the result obtained by the adder-subtracter 112 to the value held by the accumulator 116. The results obtained by the adders 113 and 114 are held by the accumulators 115 and 116, respectively. This completes one cycle of the step of the product sum operation device according to the present invention.

The values held by the accumulators 115 and 116 obtained in the above-mentioned step are supplied to the adders 113 and 114, respectively, or supplied to and stored in the memory over the buses 117 and 118, respectively, in the subsequent step.

Operation is described more in detail for exemplified cases where the product sum operation device is used for the implementation of an FIR filter and for the product sum operation with complex numbers.

First, implementation of the FIR filter is described for the case of a fourth order filter. Like the conventional product sum operation device, a filter output y(n) at a time instant n and a filter output y(n+1) at a time instant (n+1) are calculated in parallel. The calculations according to the equations (1) and (2) are carried out by the product sum operation device according to this embodiment through the following three steps. The control signal should indicate "OFF" during these three steps.

The first step involves in the following processing as a preparation for the actual calculation. First, a filter input x(n−4) is transferred from the memory through the bus 101 while a filter input x(n−3) is transferred from the memory through the bus 102. Simultaneously, the value 0 is transferred from the memory through the buses 103 and 104. The latch circuit 105 outputs the value held therein (which has no significant relation with the actual calculation) as an input to the multiplier 109 and then hold the filter input x(n−3) transferred over the bus 102.

The multiplier 107 multiplies the filter input x(n−4) with the value 0 to produce the product 0 as a multiplication result. The multiplier 108 multiplies the filter input x(n−3) with the value 0 to produce the product 0 as a multiplication result. The multiplier 109 multiplies the output of the latch circuit 105 with the value 0 to produce the product 0 as a multiplication result. The multiplier 110 multiplies the filter input x(n−4) with the value 0 to produce the product 0 as a multiplication result.

Subsequently, the adder-subtracter 111 adds the multiplication result obtained by the multiplier 107 to the multiplication result obtained by the multiplier 108 to produce the sum 0 as an addition result. On the other hand, the adder-subtracter 112 adds the multiplication result obtained by the multiplier 109 to the multiplication result obtained by the multiplier 110 to produce the sum 0 as an addition result. These addition results (=0) are stored in the accumulators 115 and 116.

In the second step, a filter input x(n−2) is transferred from the memory through the bus 101 and a filter input x(n−1) is transferred from the memory through the bus 102. Simultaneously, a filter coefficient a3 is transferred from the memory through the bus 103 and a filter coefficient a2 is transferred from the memory through the bus 104. The latch circuit 105 outputs the value x(n−3) held therein in the first step as an input to the multiplier 109 and then hold the filter input x(n−1) transferred over the bus 102.

The multiplier 107 multiplies the filter input x(n−2) with the filter coefficient a3 to produce the product of a3 and x(n−2), i.e., a3·x(n−2) as a multiplication result. The multiplier 108 multiplies the filter input x(n−1) with the filter coefficient a2 to produce the product of a2 and x(n−1), i.e., a2·x(n−1) as a multiplication result. The multiplier 109 multiplies the filter input x(n−3) held by the latch circuit 105 in the first step with the filter coefficient a3 to produce the product of a3 and x(n−3), i.e., a3·x(n−3) as a multiplication result. The multiplier 110 multiplies the filter input x(n−2) with the filter coefficient a2 to produce the product of a2 and x(n−2), i.e., a2·x(n−2) as a multiplication result.

Then, the adder-subtracter 111 adds the multiplication result obtained by the multiplier 107 to the multiplication result obtained by the multiplier 108 to produce the sum of a2 multiplied by x(n−1) and a3 multiplied by x(n−2), i.e., (a2·x(n−1)+a3x·(n−2) as an addition result. On the other hand, the adder-subtracter 112 adds the multiplication result obtained by the multiplier 109 to the multiplication result obtained by the multiplier 110 to produce the sum of a2 multiplied by x(n−2) and a3 multiplied by x(n−3), i.e., (a2·x(n−2)+a3·x(n−3) as an addition result. These addition results are added by the adders 113 and 114 to the values of 0 stored in the accumulators 115 and 116, respectively. Thus, the accumulator 115 stores a2·x(n−1)+a3·x(n−2) while the accumulator 116 stores a2·x(n−2)+a3·x(n−3).

In the third step, a filter input x(n) is transferred from the memory through the bus 101 and a filter input x(n+1) is transferred from the memory through the bus 102. Simultaneously, a filter coefficient a1 is transferred from the memory through the bus 103 and a filter coefficient a0 is transferred from the memory through the bus 104. The latch circuit 105 outputs the value x(n−1) held therein in the second step as an input to the multiplier 109 and then hold the filter input x(n+1) transferred over the bus 102.

The multiplier 107 multiplies the filter input x(n) with the filter coefficient a1 to produce the product of a1 and x(n), i.e., a1·x(n) as a multiplication result. The multiplier 108 multiplies the filter input x(n+1) with the filter coefficient a0 to produce the product of a0 and x(n+1), i.e., a0·x(n+1) as a multiplication result. The multiplier 109 multiplies the filter input x(n−1) held by the latch circuit 105 in the second step with the filter coefficient a1 to produce the product of a1 and x(n−1), i.e., a1·x(n−1) as a multiplication result. The multiplier 110 multiplies the filter input x(n) with the filter coefficient a0 to produce the product of a0 and x(n), i.e., a0·x(n) as a multiplication result.

Subsequently, the adder-subtracter 111 adds the multiplication result obtained by the multiplier 107 to the multiplication result obtained by the multiplier 108 to produce the sum of a0 multiplied by x(n+1) and a1 multiplied by x(n), i.e., (a0·x(n+1)+a1·x(n) as an addition result. On the other hand, the adder-subtracter 112 adds the multiplication result obtained by the multiplier 109 to the multiplication result obtained by the multiplier 110 to produce the sum of a0 multiplied by x(n) and a1 multiplied by x(n−1), i.e., (a0·x(n)+a1·x(n−1) as an addition result. These addition results are added by the adders 113 and 114 to the values stored in the accumulators 115 and 116, respectively. Thus, the accumulator 115 holds y(n±1) while the accumulator 116 holds y(n).

Though the above-mentioned embodiment is for a case of the fourth order FIR filter, it is apparent that the present invention is applicable to the FIR filter having any number of the order. It is also apparent that the present invention is applicable to a convolution operation in an IIR filter rather than an FIR filter.

The above-mentioned embodiment requires three steps for the calculation with the equations (1) and (2), which means 40% reduction of the steps as compared with the five-step calculation carried out by the conventional product sum operation device. The higher the order of the filter is, the closer to 50% the percentage of the reduction in steps becomes gradually.

Next, a product sum operation with complex numbers given by the equation (3) is described. The data E of the complex numbers (E+jF) are stored in the accumulator 115 while the data F are stored in the accumulator 116. The control signal indicates "ON".

Under such a circumstances, the equation (3) is calculated according to the following single step. First, the data A, B, C, and D are transferred from the memory to the multipliers 107, 108, 109, and 110 through the buses 101, 102, 103, and 104, respectively.

The multiplier 107 multiplies the data A with the data C to produce the product of A and C, i.e., A·C. The multiplier 108 multiplies the data B with the data D to produce the product of B and D, i.e., B·D. The multiplier 109 multiplies the data B with the data C to produce the product of B and C, i.e., B·C. The multiplier 110 multiplies the data A with the data D to produce the product of A and D, i.e., A·D.

Subsequently, the adder-subtracter 111 subtracts the product of B and D obtained by the multiplier 108 from the product of A and C obtained by the multiplier 107 to produce a subtraction result of (A·C−B·D). The adder-subtracter 111 adds the product of B and C obtained by the multiplier 109 to the product of A and D obtained by the multiplier 110 to produce an addition result of (A·D+B·C).

These results are supplied to the adders 113 and 114 where they are added to the values held by the accumulators 115 and 116, respectively. Thus the accumulator 115 holds the value equal to A multiplied by C minus B multiplied by D plus E, that is, (A·C−B·D+E) and the accumulator 116 holds the value equal to A multiplied by D plus B multiplied by C plus F, that is (A·D+B·C+F).

The conventional product sum operation device requires three steps for the product sum operation with the complex numbers. On the contrary, the product sum operation device according to the present invention requires only single step for the equivalent calculation. This means an approximately 67% reduction of the steps.

Figure 3:
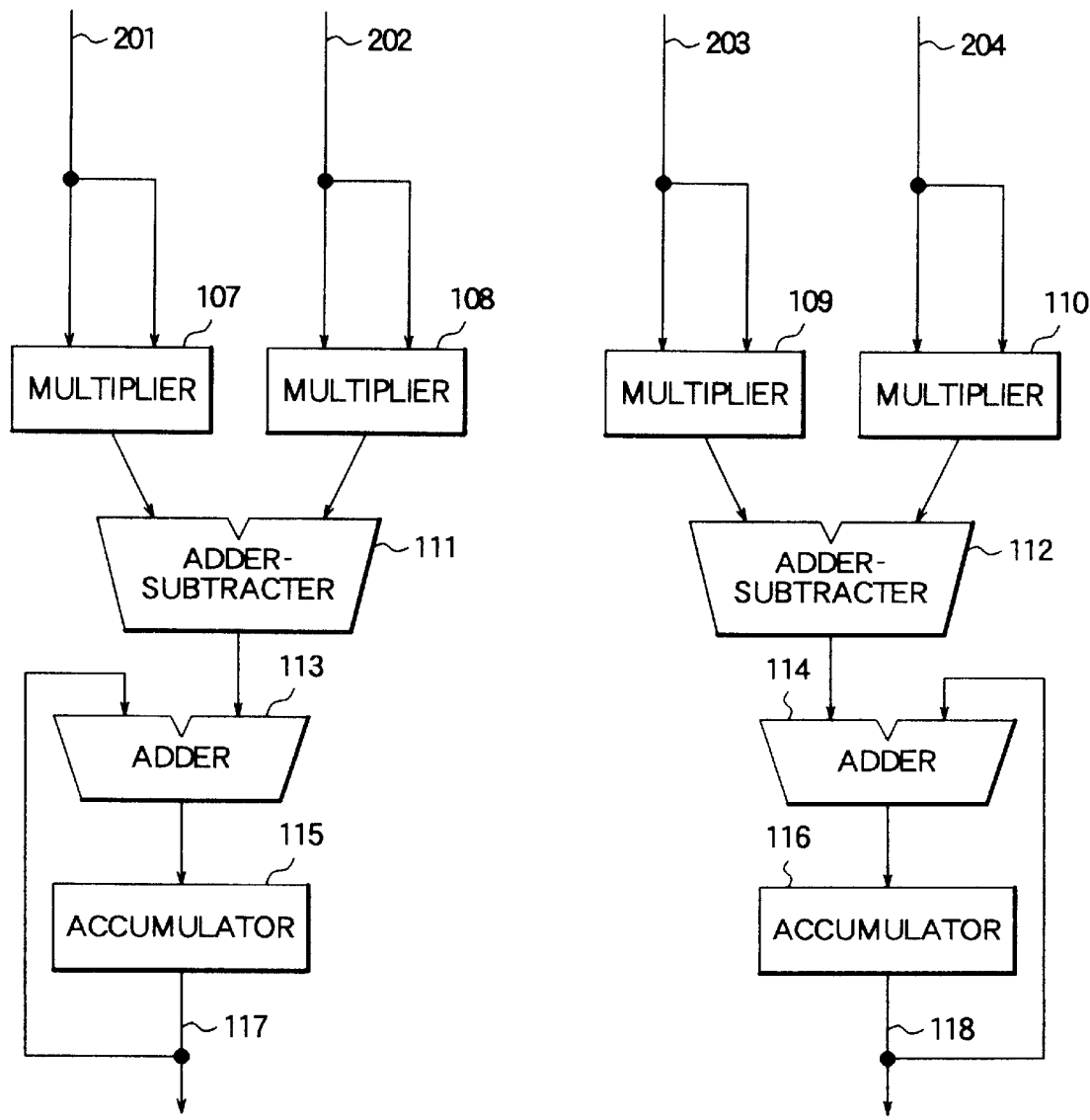
FIG. 3 is a block diagram showing a configuration of a product sum operation device according to a second embodiment of the present invention.

Referring to FIG. 3, a product sum operation device according to a second embodiment of the present invention is described. In FIG. 3, the product sum operation device according to this embodiment is different from the first embodiment in the connections of buses 201, 202, 203, and 204 which are used for transferring data from a memory (not shown) to the multipliers 107 through 110. The multiplier 107 is supplied with the data transferred from the memory through the bus 201 as a first input and a second input for the multiplier. The multiplier 108 is supplied with the data transferred from the memory through the bus 202 as a first input and a second input for the multiplier. The multiplier 109 is supplied with the data transferred from the memory through the bus 203 as a first input and a second input for the multiplier. The multiplier 110 is supplied with the data transferred from the memory through the bus 204 as a first input and a second input for the multiplier.

Now, how the product sum operation device according to the present invention provides its function is described. As an example, description is made for a parallel calculation of a square sum according to the following equations (4) and (5):

$$P = A^2 + B^2 + C^2 + D^2 \qquad (4)$$

$$Q = E^2 + F^2 + G^2 + H^2 \qquad (5)$$

wherein A through H represent data.

The calculations with the equations (4) and (5) requires three steps. First step involves in the following processing as a preparation for the actual calculation. First, the value 0 is transferred from the memory to the multipliers 107 through 110 via the buses 201 through 204. The multipliers 107 through 110 calculates the square of zero and produces the result of zero as a multiplication result.

Subsequently, the adder-subtracter 111 sums the multiplication results obtained by the multipliers 107 and 108 and produces the result of zero as an addition result. The adder-subtracter 112 sums the multiplication results obtained by the multipliers 109 and 110 and produces the result of zero as an addition result. These addition results are stored in the accumulators 115 and 116, respectively.

In the second step, the data A, B, E, and F are transferred from the memory to the multipliers 107, 108, 109, and 110 through the buses 201, 202, 203, and 204, respectively. The multiplier 107 calculates the square of the data A and produces $A^2$ as a multiplication result. The multiplier 108 calculates the square of the data B and produces $B^2$ as a multiplication result. The multiplier 109 calculates the square of the data E and produces $E^2$ as a multiplication result. The multiplier 110 calculates the square of the data F and produces $F^2$ as a multiplication result.

Next, the adder-subtracter 111 sums the multiplication results obtained by the multipliers 107 and 108 and produces the result of $(A^2+B^2)$ as an addition result. Likewise, the adder-subtracter 112 sums the multiplication results obtained by the multipliers 109 and 110 and produces the result of $(E^2+F^2)$ as an addition result. These addition results are supplied to the adders 113 and 11 4 where they are added to the value of 0 held by the accumulators 115 and 116, respectively. Thus, the accumulator 115 holds $(A^2+B^2)$ while the accumulator 116 holds $(E^2+F^2)$.

In the third step, the data C, D, G, and H are transferred from the memory to the multipliers 107, 108, 109, and 110 through the buses 201, 202, 203, and 204, respectively.

The multiplier 107 calculates the square of the data C and produces $C^2$ as a multiplication result. The multiplier 108 calculates the square of the data D and produces $D^2$ as a multiplication result. The multiplier 109 calculates the square of the data G and produces $G^2$ as a multiplication result. The multiplier 110 calculates the square of the data H and produces $H^2$ as a multiplication result.

Then, the adder-subtracter 111 sums the multiplication results obtained by the multipliers 107 and 108 and produces the result of $(C^2+D^2)$ as an addition result. Likewise, the adder-subtracter 112 sums the multiplication results obtained by the multipliers 109 and 110 and produces the result of $(G^2+H^2)$ as an addition result. These addition results are supplied to the adders 113 and 114 where they are added to the values held by the accumulators 115 and 116, respectively. Thus, the accumulator 115 holds the result P given by the equation (4) while the accumulator 116 holds the result Q given by the equation (5).

Figure 4:
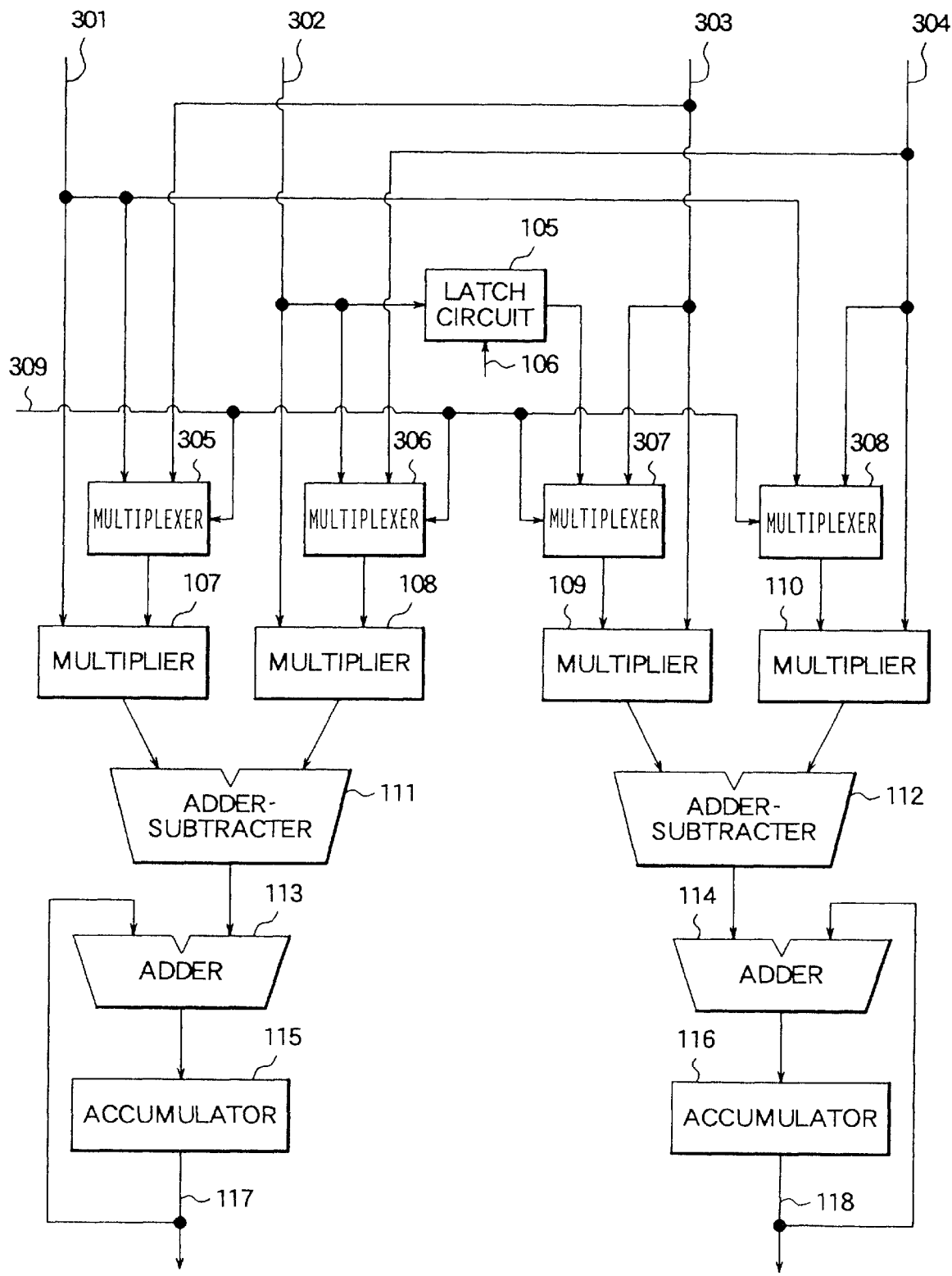
FIG. 4 is a block diagram showing a configuration of a product sum operation device according to a third embodiment of the present invention.

Now, referring to FIG. 4, a product sum operation device according to a third embodiment of the present invention is described. In FIG. 4, the product sum operation device according to this embodiment is a modification of the embodiments shown in FIGS. 2 and 3 configured to achieve these two embodiments as a single embodiment.

The product sum operation device according to this embodiment is different from the first embodiment in the connections of buses 301, 302, 303, and 304 which are used for transferring data from a memory (not shown) to the multipliers 107, 108, 109, and 110, respectively. Furthermore, other differences are multiplexers 305, 306, 307 and 308 placed on the buses 301, 302, 303 and 304 and the use of a selection signal 309. The selection signal 309 is a signal for functioning the operation device as the product sum operation device according to the first embodiment and/or as the product sum operation device according to the second embodiment.

The selection signal 309 indicates "OFF" when the operation device is intended to be used as the product sum operation device according to the first embodiment. The selection signal 309 indicates "ON" when the operation device is intended to be used as the product sum operation device according to the second embodiment. The multiplexer 305 is supplied with the selection signal 309 and the data transferred from the memory through the buses 301 and 303. The multiplexer 305 outputs the data supplied over the bus 303 when the selection signal 309 indicates "OFF". The multiplexer 305 outputs the data supplied over the bus 301 when the selection signal 309 indicates "ON". The multiplexer 306 is supplied with the selection signal 309 and the data transferred from the memory through the buses 302 and 304. The multiplexer 306 outputs the data supplied over the bus 304 when the selection signal 309 indicates "OFF". The multiplexer 306 outputs the data supplied over the bus 302 when the selection signal 309 indicates "ON ".

The multiplexer 307 is supplied with the selection signal 309, the data transferred through the bus 303 and the data supplied from the latch circuit 105. The multiplexer 307 outputs the data supplied from the latch circuit 105 when the selection signal 309 indicates "OFF". The multiplexer 307 outputs the data supplied over the bus 303 when the selection signal 309 indicates "ON". The multiplexer 308 is supplied with the selection signal 309 and the data transferred from the memory through the buses 301 and 304. The multiplexer 308 outputs the data supplied over the bus 301 when the selection signal 309 indicates "OFF". The multiplexer 308 outputs the data supplied over the bus 304 when the selection signal 309 indicates "ON".

The multiplier 107 multiplies the data transferred from the memory through the bus 301 with the data supplied from the multiplexer 305 to produce the product as a multiplication result. The multiplier 108 multiplies the data transferred from the memory through the bus 302 with the data supplied from the multiplexer 306 to produce the product as a multiplication result. The multiplier 109 multiplies the data transferred from the memory through the bus 303 with the data supplied from the multiplexer 307 to produce the product as a multiplication result. The multiplier 110 multiplies the data transferred from the memory through the bus 304 with the data supplied from the multiplexer 308 to produce the product as a multiplication result.

From the viewpoint how the operation device provides its functions, the operation device of this embodiment is similar to the one described in conjunction with the first embodiment when the selection signal 309 indicates "OFF" and is similar to the one described in conjunction with the second embodiment when the selection signal 309 indicates "ON".

The above-mentioned three embodiments may be applied as an operation device for digital signal processors and microprocessors.

As described above, the product sum operation device according to the present invention has more multipliers and adder-subtracters than the conventional product sum operation devices do. This contributes to the acceleration of product sum operations as compared with the conventional product sum operation devices. In addition, the product sum operation device implemented by the first and the second embodiments requires no multiplexer that is required in the conventional product sum operation device. This simplifies the configuration and structure of the operation unit.

The product sum operation device according to the present invention has a switch for use in controlling the supply of the data. More specifically, the control signal is used to control whether the data transferred through the data transfer bus is immediately supplied to the multiplier or is supplied later when the subsequent data is transferred over the data transfer bus. Therefore, the product sum operation device of the present invention is suitable for various product sum operations such as a product sum operation with complex numbers and product sum operation with real numbers by means of convolution operation for providing an FIR filter.

Furthermore, the product sum operation device according to the present invention has the multipliers capable of calculating a square of the data transferred over the data transfer bus. This means that the product sum operation device can be used for a fast calculation of a square sum.

In addition, the product sum operation device according to the third embodiment has the multiplexers that are adapted to supply to the first through the fourth multipliers either the data transferred through the first through the fourth data transfer buses or the data sent through another bus. Accordingly, various product sum operation including the square sum operation can be carried out at a high speed.

What is claimed is:

1. A product sum operation device comprising:

data transfer means for transferring four data simultaneously;

first through fourth multipliers each adapted to receive two data that are assigned in advance out of the four data transferred from said data transfer means to carry out a multiplication operation with said two data received;

switching means connected between said data transfer means and a specific one of said first through said fourth multipliers, said switch means being supplied with a control signal, said switch means being adapted to receive one of the data assigned to the specific one of said multipliers and supplying it immediately to the specific one of said multipliers when said control signal indicates a first state, said switch means supplying previous data to the specific one of said multipliers on reception of next data from said data transfer means when the control signal indicates a second state;

a first adder-subtracter for carrying out adding and subtracting operations with the multiplication results obtained by said first and second multipliers;

a second adder-subtracter for carrying out adding and subtracting operations with the multiplication results obtained by said third and said fourth multipliers;

first and second accumulators;

a first adder for adding the addition result obtained by said first adder-subtracter to a value previously stored in said first accumulator to give the addition result to said first accumulator as a new value; and a second adder for adding the addition result obtained by said second adder-subtracter to a value previously stored in said second accumulator to give the addition result to said second accumulator as a new value.

2. A product sum operation device as claimed in claim 1, wherein said switch means is a latch circuit.

3. A product sum operation device as claimed in claim 1, wherein said data transfer means comprises four buses.

4. A product sum operation device comprising:

data transfer means for transferring four data simultaneously;

first through fourth multipliers each provided correspondingly to one of the four data transferred from said data transfer means to calculate square of said data transferred;

a first adder-subtracter for carrying out adding and subtracting operations with the multiplication results obtained by said first and second multipliers;

a second adder-subtracter for carrying out adding and subtracting operations with the multiplication results obtained by said third and said fourth multipliers;

first and second accumulators;

a first adder for adding the addition result obtained by said first adder-subtracter to a value previously stored in said first accumulator to give the addition result to said first accumulator as a new value; and a second adder for adding the addition result obtained by said second adder-subtracter to a value previously stored in said second accumulator to give the addition result to said second accumulator as a new value.

5. A product sum operation device as claimed in claim 4, wherein said data transfer means comprises four buses.

6. A product sum operation device comprising:

first through fourth buses for transferring first through fourth data;

first through fourth multiplexers each connected to two buses of said first through said fourth buses that are assigned in advance, said first through said fourth multiplexers being for selecting, in response to a selection signal, one of the data transferred through said two buses in accordance with said selection signal to produce the selected data;

a first multiplier for multiplying the data transferred through said first bus with the data supplied from said first multiplexer;

a second multiplier for multiplying the data transferred through said second bus with the data supplied from said second multiplexer;

a third multiplier for multiplying the data transferred through said third bus with the data supplied from said third multiplexer;

a fourth multiplier for multiplying the data transferred through said fourth bus with the data supplied from said fourth multiplexer;

switching means connected between a specific one of said first through said fourth buses and a specific one of said first through said fourth multiplexers, said switch means being supplied with a control signal, said switch means being adapted to receive the data transferred through the specific one of said buses and supply it immediately to the specific one of said multiplexers when the control signal indicates a first state, said switch means supplying previous data to the specific one of said multiplexers on reception of next data transferred through the specific one of said buses when said control signal indicates a second state;

a first adder-subtracter for carrying out adding and subtracting operations with the multiplication results obtained by said first and said second multipliers;

a second adder-subtracter for carrying out adding and subtracting operations with the multiplication results obtained by said third and said fourth multipliers;

first and second accumulators;

a first adder for adding the addition result obtained by said first adder-subtracter to a value previously stored in said first accumulator to give the addition result to said first accumulator as a new value; and a second adder for adding the addition result obtained by said second adder-subtracter to a value previously stored in said second accumulator to give the addition result to said second accumulator as a new value.

7. A product sum operation device as claimed in claim 6, wherein said switch means is a latch circuit.

* * * * *